(12) United States Patent
Singh et al.

(10) Patent No.: US 10,037,826 B2
(45) Date of Patent: Jul. 31, 2018

(54) APPARATUS FOR SUPPORTING SPENT NUCLEAR FUEL

(71) Applicant: Holtec International, Marlton, NJ (US)

(72) Inventors: Krishna P. Singh, Hobe Sound, FL (US); P. Stefan Anton, Southampton, NJ (US)

(73) Assignee: HOLTEC INTERNATIONAL

( * ) Notice: Subject to any disclaimer, the term of this patent is extended or adjusted under 35 U.S.C. 154(b) by 714 days.

(21) Appl. No.: 14/811,454

(22) Filed: Jul. 28, 2015

(65) Prior Publication Data

US 2016/0027538 A1 Jan. 28, 2016

Related U.S. Application Data

(60) Provisional application No. 62/029,931, filed on Jul. 28, 2014.

(51) Int. Cl.
*G21C 19/07* (2006.01)
*G21C 19/40* (2006.01)

(52) U.S. Cl.
CPC .............. *G21C 19/07* (2013.01); *G21C 19/40* (2013.01)

(58) Field of Classification Search
CPC .................................. G21C 19/07; G21C 19/40
USPC ......................................................... 376/272
See application file for complete search history.

(56) References Cited

U.S. PATENT DOCUMENTS

| 4,857,263 | A | * | 8/1989 | Machado | ............... | G21C 19/07 |
| | | | | | | 376/272 |
| 5,384,813 | A | | 1/1995 | Loftis et al. | | |
| 6,665,365 | B2 | | 12/2003 | Dallongeville et al. | | |
| 7,715,517 | B2 | | 5/2010 | Singh et al. | | |
| 8,139,706 | B2 | | 3/2012 | Singh et al. | | |
| 8,158,962 | B1 | | 4/2012 | Rosenbaum et al. | | |
| 8,576,976 | B2 | | 11/2013 | Singh et al. | | |
| 2008/0260088 | A1 | | 10/2008 | Singh et al. | | |
| 2009/0175404 | A1 | | 7/2009 | Singh et al. | | |
| 2010/0232563 | A1 | | 9/2010 | Singh et al. | | |
| 2011/0142189 | A1 | | 6/2011 | Foussard et al. | | |
| 2013/0077728 | A1 | | 3/2013 | Scaglione et al. | | |

(Continued)

FOREIGN PATENT DOCUMENTS

| CN | 1208495 | 2/1999 |
| CN | 102084433 | 6/2011 |
| WO | 2013096966 | 6/2013 |

OTHER PUBLICATIONS

Corresponding Office Action and Search Report issued by the SIPO dated Sep. 29, 2017.

(Continued)

*Primary Examiner* — Jack W Keith
*Assistant Examiner* — Daniel Wasil
(74) *Attorney, Agent, or Firm* — The Belles Group, P.C.

(57) ABSTRACT

A fuel rack apparatus includes: a base plate having an upper surface and a lower surface; and a plurality of storage tubes coupled to and extending upward from the upper surface of the base plate, the storage tubes arranged in a side-by-side arrangement to form an array of the storage tubes. Each of the storage tubes extend along a longitudinal axis and include: an outer tube having an inner surface defining an inner cavity; and an inner plate-assemblage positioned within the outer tube that divides the inner cavity into a plurality of interior flux trap chambers and a fuel storage cell.

14 Claims, 12 Drawing Sheets

(56) References Cited

U.S. PATENT DOCUMENTS

2013/0343503 A1 12/2013 Agace et al.
2014/0105347 A1 4/2014 Singh et al.

OTHER PUBLICATIONS

Corresponding International Search Report and Written Opinion for PCT/US15/42502 dated Oct. 28, 2015.

* cited by examiner

APPARATUS FOR SUPPORTING SPENT NUCLEAR FUEL

CROSS REFERENCE TO RELATED APPLICATIONS

The present application claims the benefit of U.S. Provisional Patent Application Ser. No. 62/029,931, filed Jul. 28, 2034, the disclosure of which is incorporated herein by reference in its entirety.

FIELD OF THE INVENTION

The field of the present invention relates to racks for the storage of nuclear fuel, and particularly for storing spent nuclear fuel.

BACKGROUND

In the nuclear power industry, the nuclear energy source is in the form of hollow zircaloy tubes filled with enriched uranium, known as fuel assemblies. Upon being depleted to a certain level, spent fuel assemblies are removed from a reactor. At this time, the fuel assemblies not only emit extremely dangerous levels of neutrons and gamma photons (i.e., neutron and gamma radiation) but also produce considerable amounts of heat that must be dissipated.

It is necessary that the neutron and gamma radiation emitted from the spent fuel assemblies be adequately contained at all times upon being removed from the reactor. It is also necessary that the spent fuel assemblies be cooled. Because water is an excellent radiation absorber, spent fuel assemblies are typically submerged under water in a pool promptly after being removed from the reactor. The pool water also serves to cool the spent fuel assemblies by drawing the heat load away from the fuel assemblies. The water may also contain a dissolved neutron shielding substance.

The submerged fuel assemblies are typically supported in the fuel pools in a generally upright orientation in rack structures, commonly referred to as fuel racks. It is well known that neutronic interaction between fuel assemblies increases when the distance between the fuel assemblies is reduced. Thus, in order to avoid criticality (or the danger thereof) that can result from the mutual inter-reaction of adjacent fuel assemblies in the racks, it is necessary that the fuel racks support the fuel assemblies in a spaced manner that allows sufficient neutron absorbing material to exist between adjacent fuel assemblies. The neutron absorbing material can be the pool water, a structure containing a neutron absorbing material, or combinations thereof.

Fuel racks for high density storage of fuel assemblies are commonly of cellular construction with neutron absorbing plate structures (i.e., shields) placed between the storage cells in the form of solid sheets. For fuel assemblies that have a square horizontal cross-sectional profile, the storage cells are usually long vertical square tubes which are open at the top through which the fuel elements are inserted. In order to maximize the number of fuel assemblies that can be stored in a single rack, the fuel racks for these square tubes are formed by a rectilinear array of the square tubes. Similarly, for fuel assemblies that have a hexagonal horizontal cross-sectional profile, the storage cells are usually long vertical hexagonal tubes which are open at the top through which the fuel elements are inserted. For such storage cells, in order to maximize the number of fuel assemblies that can be stored in a single rack, the fuel racks for these hexagonal tubes are formed by a honeycomb array of the hexagonal tubes.

Regardless of whether the storage cells are square tubes or hexagonal tubes, the storage cells of some fuel racks may include double walls that can serve two functions. The first function of a double cell wall may be to encapsulate neutron shield sheets to protect the neutron shield from corrosion or other deterioration resulting from contact with water. The second function of a double cell wall may be to provide flux traps to better prevent undesirable heat build-up within the array of storage cells. When both of these double-wall functions are incorporated into a fuel rack array, it necessarily decreases the storage density capability. Thus, improvements are desired in design a fuel racks that provide both these functions and improve the overall storage density capability.

BRIEF SUMMARY

The present invention is directed to an apparatus for supporting spent nuclear fuel. Specifically, the apparatus enables the high density storage of spent nuclear fuel.

In a first separate aspect of the invention, a fuel rack apparatus includes: a base plate having an upper surface and a lower surface; and a plurality of storage tubes coupled to the upper surface of the base plate in a side-by-side arrangement to form a rectilinear array of the storage tubes. Each of the storage tubes extends along a longitudinal axis and includes: a rectangular outer tube having an inner surface defining an inner cavity; a first chevron plate comprising a first wall plate and a second wall plate; and a second chevron plate comprising a first wall plate and a second wall plate. The first and second chevron plates are positioned in the inner cavity in opposing relation to divide the inner cavity into: (1) a first chamber formed between the first wall plate of the first chevron plate and a first corner section of the rectangular outer tube; (2) a second chamber formed between the second wall plate of the first chevron plate and a second corner section of the rectangular outer tube; (3) a third chamber formed between the first wall plate of the second chevron plate and a third corner section of the rectangular outer tube; (4) a fourth chamber formed between the second wall plate of the second chevron plate and a fourth corner section of the rectangular outer tube; and (5) a fuel storage cell having a hexagonal transverse cross-section and configured to receive a fuel assembly containing spent nuclear fuel.

In a second separate aspect of the invention, a fuel rack apparatus for storing spent nuclear fuel includes: a base plate having an upper surface and a lower surface; and a plurality of storage tubes coupled to and extending upward from the upper surface of the base plate, the storage tubes arranged in a side-by-side arrangement to form an array of the storage tubes. Each of the storage tubes extend along a longitudinal axis and include: an outer tube having an inner surface defining an inner cavity; and an inner plate-assemblage positioned within the outer tube that divides the inner cavity into a plurality of interior flux trap chambers and a fuel storage cell.

In a third separate aspect of the invention, a fuel rack apparatus includes: a base plate having an upper surface and a lower surface; and a plurality of storage tubes coupled to the upper surface of the base plate in a side-by-side arrangement to form a rectilinear array of the storage tubes. Each of the storage tubes extends along a longitudinal axis and includes: a rectangular outer tube having an inner surface defining an inner cavity; and a plurality of wall plates positioned in the inner cavity that divide the inner cavity into: (1) a first interior flux chamber formed between a first one of the wall plates and a first corner section of the rectangular outer tube; (2) a second interior flux chamber formed between a second one of the wall plates and a second corner section of the rectangular outer tube; (3) a third interior flux chamber formed between a third one of the wall plates and a third corner section of the rectangular outer tube; (4) a fourth interior flux chamber formed between a fourth one of wall plates and a fourth corner section of the rectangular outer tube; and (5) a fuel storage cell having a hexagonal transverse cross-section and configured to receive a fuel assembly containing spent nuclear fuel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
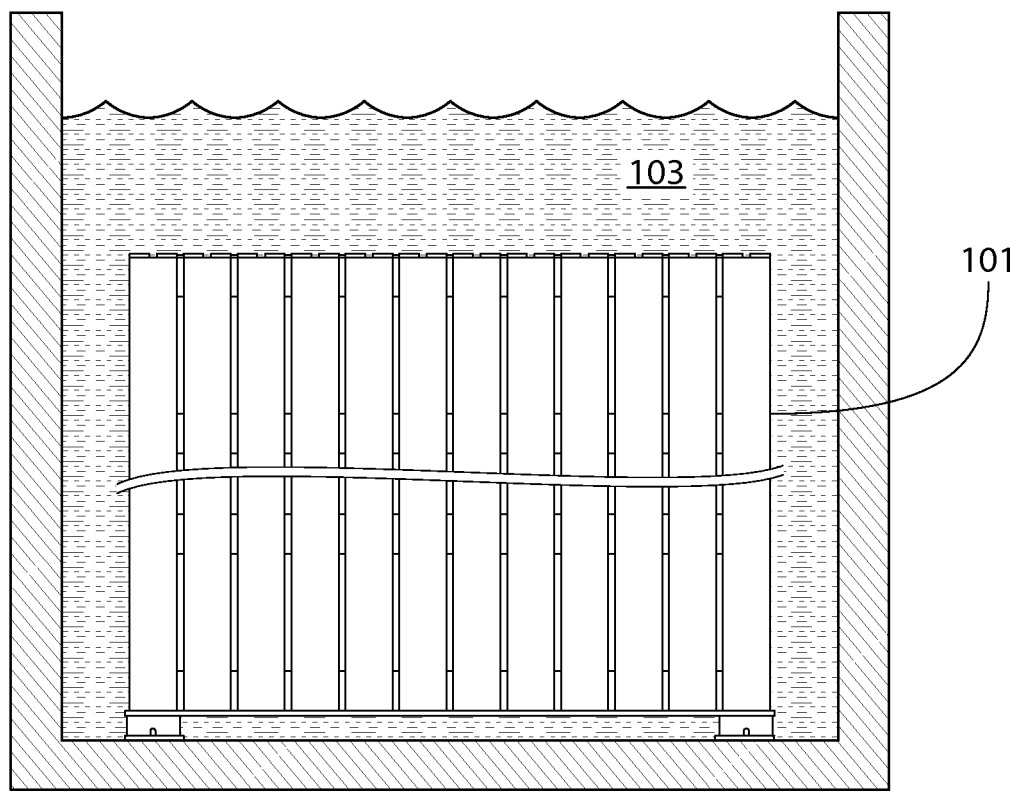
FIG. 1 is a schematic view of a fuel rack within a fuel storage pool.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 2:
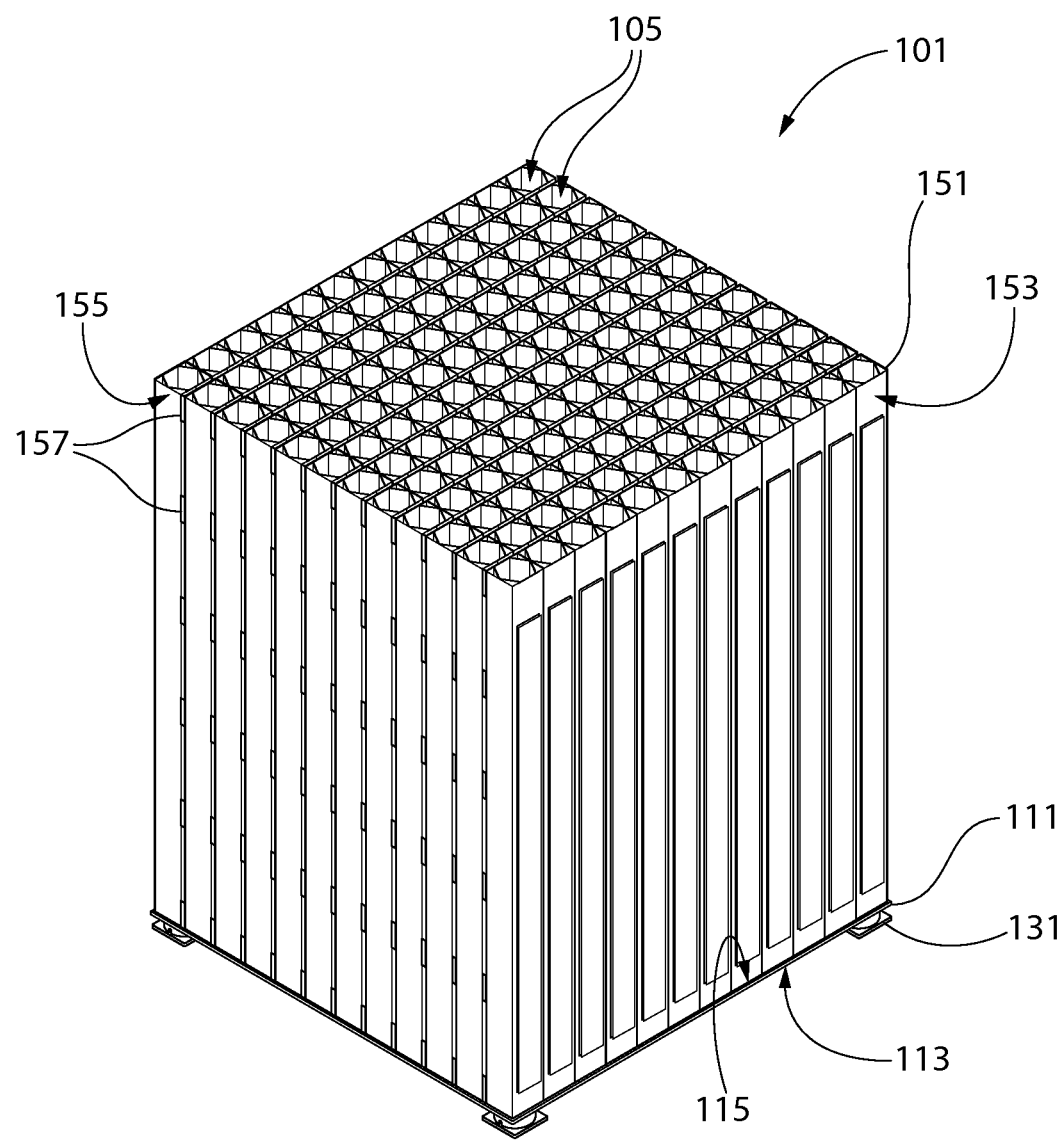
FIG. 2 is a perspective view of a first embodiment of a fuel rack for storing fuel assemblies.

Turning in detail to the drawings, FIG. 1 schematically shows a fuel rack 101, according to one embodiment of the invention, placed in a cooling pool 103 for the storage of spent nuclear fuel. As is known in the art, the cooling pool 103 may include treated water to aid in neutron absorption and heat dispersion, with examples including demineralized water and borated water. The fuel rack 101, as shown in FIG. 2, includes a rectilinear array of hexagonal fuel storage cells 105. The fuel rack 101 is a cellular, upright, prismatic module. The illustrated embodiment of the fuel rack 101 is specifically designed to accommodate hexagonal fuel assemblies, such as VVER 1000 fuel assemblies. To this extent, each fuel storage cell 105 of the fuel rack 101 also has a hexagonal cross-sectional profile so as to geometrically accommodate no more than a single hexagonal fuel assembly. In certain embodiments, the hexagonal cross-sectional profile of the storage cell 101 may have a shape that is other than a regular hexagon. It is to be understood that the concepts of the present invention can be modified to accommodate any shaped fuel assembly, including rectangular, octagonal, round, among others.

Figure 3A:
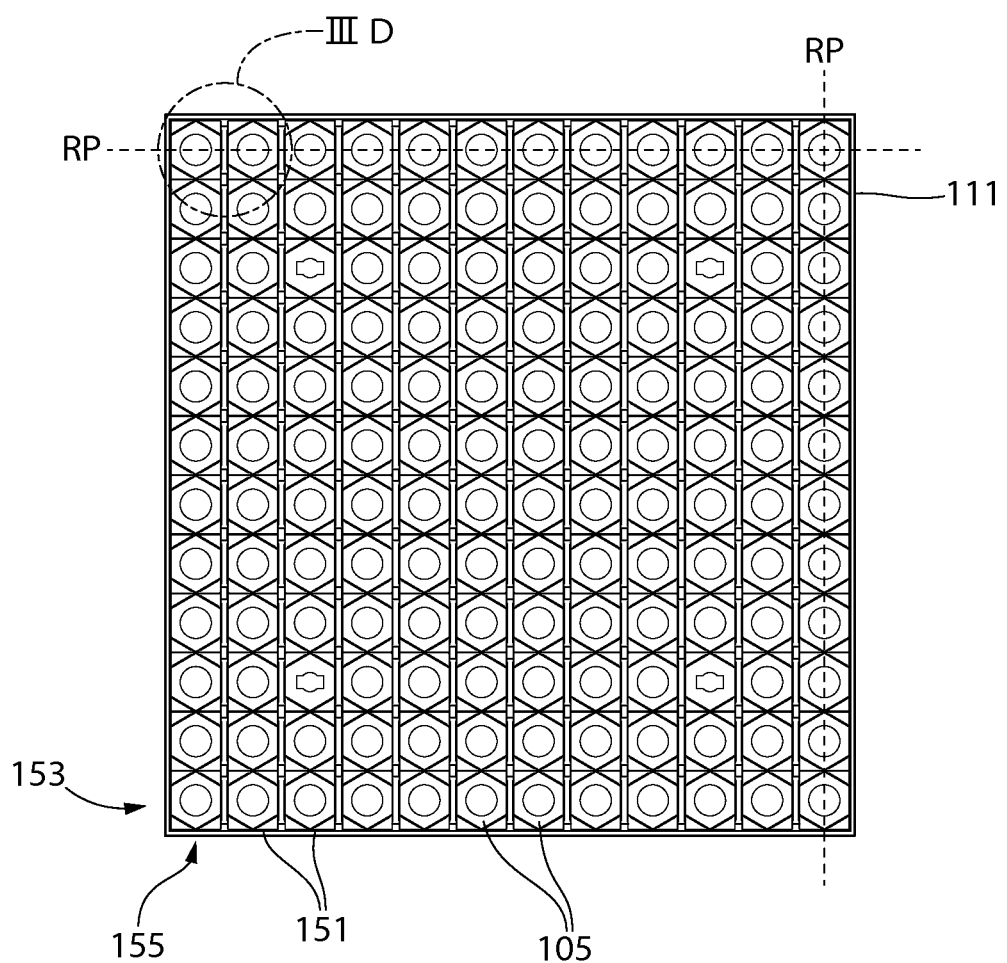
FIG. 3A is a top elevation view of the fuel rack of FIG. 2.

The fuel rack 101 includes a base plate 111, support pedestals 131, and a plurality of storage tubes 151 placed together in a side-by-side arrangement to form a rectilinear array as shown in FIG. 3A. The support pedestals 131 are affixed to a bottom surface 113 of the base plate 111, and the array of storage tubes 151 are affixed to the top surface 115 of the base plate 111 in a substantially vertical orientation. Each storage tube 151 extends along its own longitudinal axis LA, and in addition to being substantially vertical, each longitudinal axis LA is also substantially perpendicular to the top surface 115 of the base plate 111. The connection between each of the storage tubes 151 and the base plate 111 is achieved by welding the bottom edge of each of the storage tubes 151 to the top surface 115 of the base plate 111. Similarly, the connection between each of the support pedestals 131 and the base plate 111 is achieved by welding each of the support pedestals 131 to the bottom surface 113 of the base plate 111. By welding the storage tubes 151 to the base plate 111, the flexural strength of the base plate 11 may be increased, thereby making it possible to support the combined weight of the fuel rack and fuel assemblies with the support pedestals 131 located only near the edges of the base plate 111. Of course, other connection techniques can be utilized for either or both of the storage tubes 151 and the support pedestals 131 with minor modification, including mechanical connections such as bolting, clamping, threading, and the like.

As shown in FIGS. 3A-D, the storage tubes 151 are connected to the base plate 111 to form a plurality of rows 153 and a plurality of columns 155. The storage tubes 151 within each row 153 are placed in a spaced apart manner, with the spacing between adjacent storage tubes 151 in a row 153 being maintained by spacers 157. Spacers 157 are placed between all adjacent storage tubes 151 within a row 153, with several spacers 157 being used to separate two adjacent storage tubes 151. The spacers 157 are welded in place to each of the adjacent storage tubes 151. Several spacers 157 are placed between each of the aligned longitudinal edges of adjacent storage tubes 151, with spacers 157 being placed at the top and bottom of aligned longitudinal edges, and the other spacers being spaced along the aligned longitudinal edges. The number of spacers 157 included between adjacent storage tubes 151 may vary depending on factors such as the desired fluid flow between adjacent storage tubes 151 and/or between adjacent columns 155, space considerations, and weight of the entire fuel rack, among other considerations.

By having the spacers 157 distributed in this manner, the space between adjacent columns 155 forms flux traps 159, not only between adjacent ones of the storage tubes 151 within each row 153, but also between entire columns 155. These flux traps 159 are exterior to each of the storage tubes 151, and because the flux trap 159 of one row 153 is not partitioned from the flux trap 159 of an adjacent row 153, adjacent ones of the flux traps 159 effectively separate one column 155 from another. The width of the spacers 157, and thus the width of the flux traps 159, may be selected to tailor the ability to control criticality of the nuclear fuel stored within the fuel rack 101.

The storage tubes 151 within each column 155 are placed adjacent each other so that the outer walls of adjacent storage tubes 151 within the respective column 155 are in surface contact with one another. Each of the aligned longitudinal edges of adjacent storage tubes 151 within a column 155 may be contiguously welded together to provide additional stability to the overall structure of the fuel rack 101.

With the rectilinear array of the fuel rack 101 formed with the plurality of rows 153 and columns 155 as described above, the longitudinal axes LA of each of the storage tubes 151 in each of the rows 153 and in each of the columns 155 align to form reference planes RP. Also, the longitudinal axes LA of adjacent storage tubes 151 in one of the rows 153 may be separated from one another by a distance D1, and the longitudinal axes LA of adjacent storage tubes 151 in one of the columns 155 may be separated from one another by a distance D2, which may different, and even greater, than the distance D1. The distance D1 separating adjacent storage tubes 151 within a row 153 may be controlled within a design by appropriate selection of either the width of the storage tubes 151 or the width of the spacers 157. The distance D2 separating adjacent storage tubes 151 within a column 155 may be controlled within a design by appropriate selection of the length of the storage tubes 151.

Figure 4A:
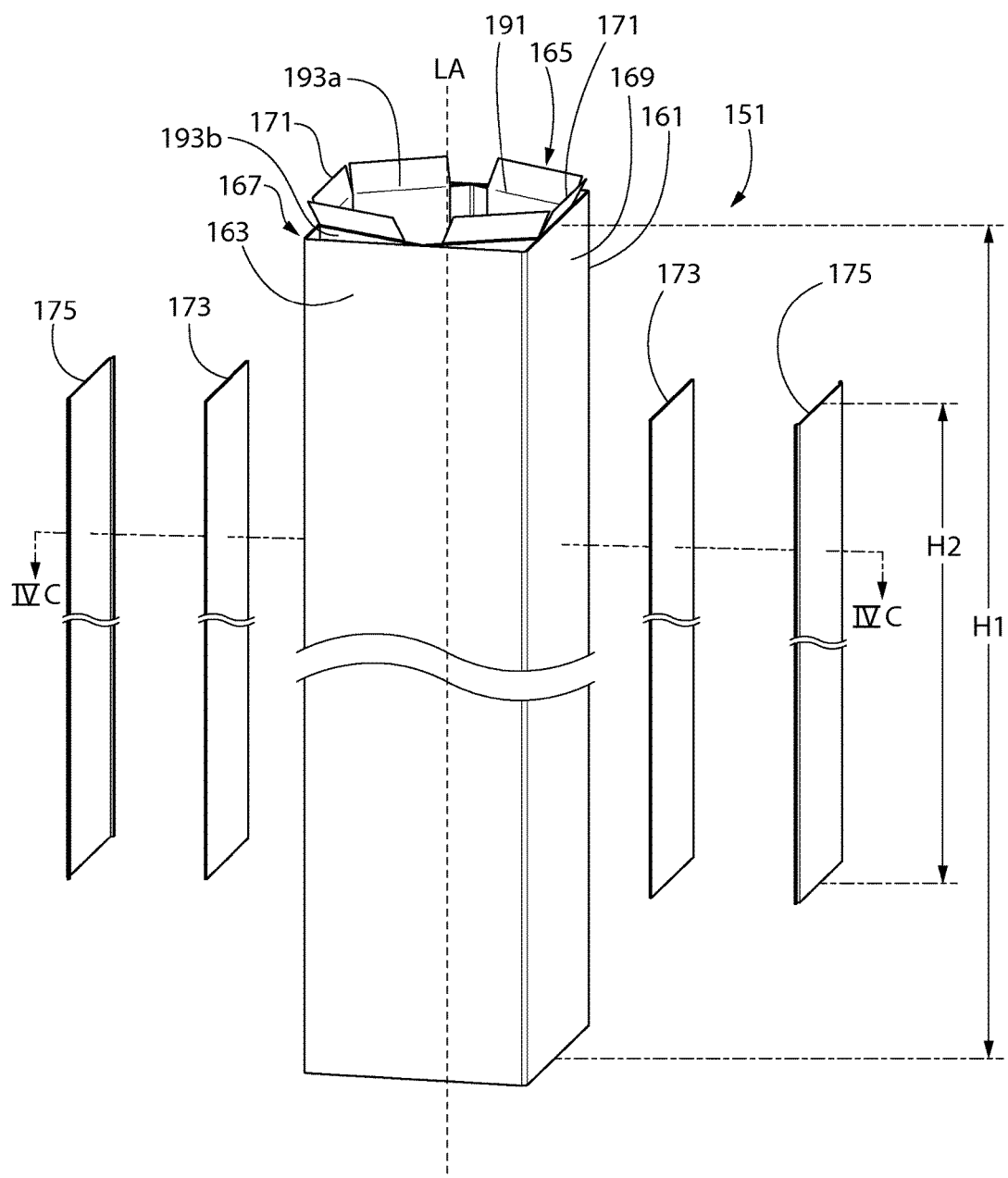
FIG. 4A is an exploded perspective view of a single storage cell.
Figure 4B:
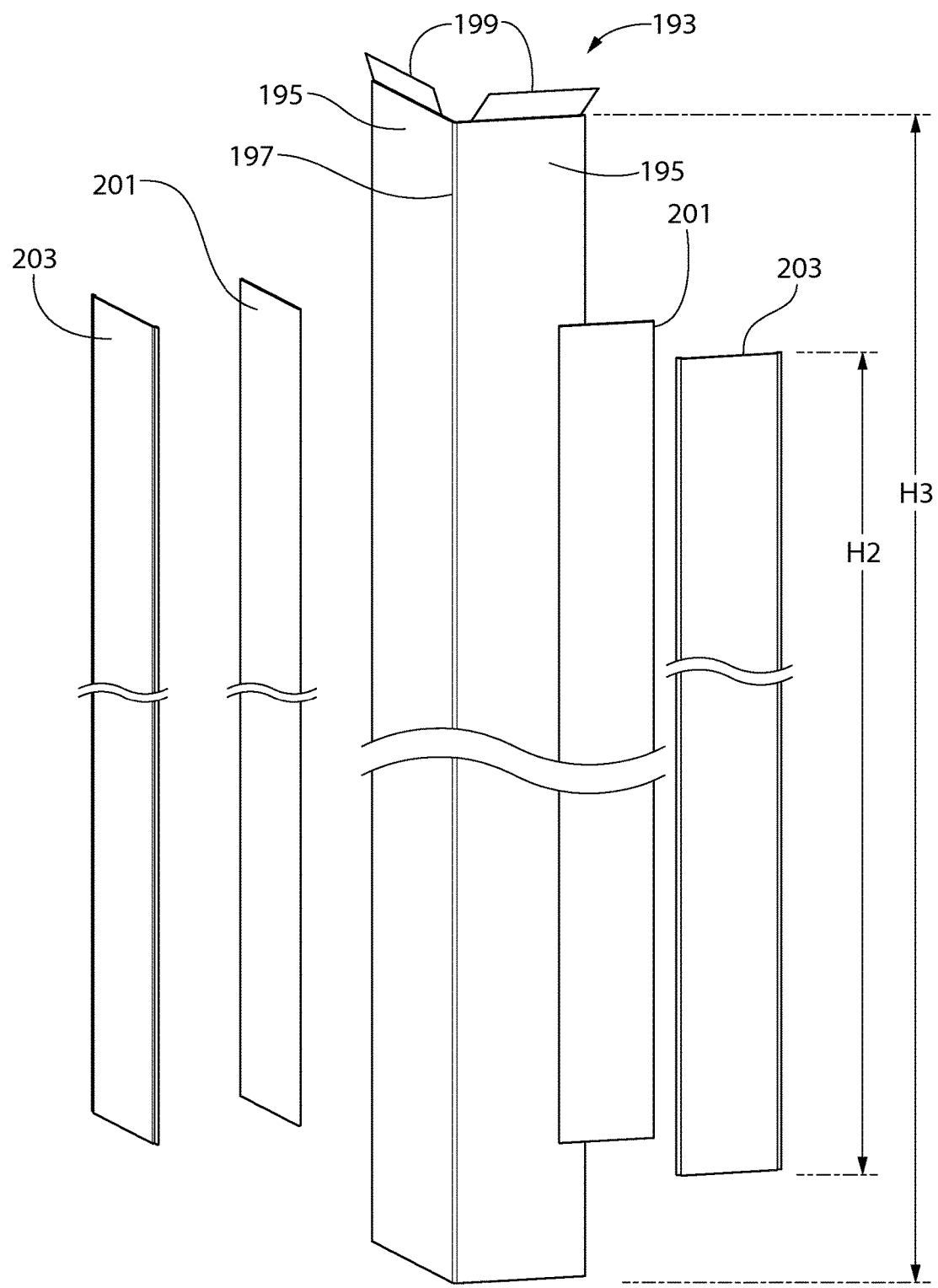
FIG. 4B is an exploded perspective view of a single chevron plate.

An exemplary storage tube 151 is shown in FIG. 4A. The storage tube 151 includes an outer tube 161 having a rectangular cross-section, as can be seen in FIG. 4B. The top end of the storage tube 151 remains open so that a fuel assembly can be inserted into the hexagonal fuel storage cell 105 formed therein. The storage tube 151 includes a first pair of opposing wall plates 163, 165 and a second pair of opposing wall plates 167, 169. The outer walls of the first pair of wall plates 163, 165 are placed into surface contact with respective outer walls of wall plates 163, 165 of adjacent storage tubes 151 to form the columns 155 of the rectilinear array, as discussed above. The storage tube 151 defines a longitudinal axis LA, which is the center point of the rectangular cross-section, and the wall plates 163, 165, 167, 169 each have an overall height H1.

The top of each of the second pair of opposing wall plates 167, 169 includes a guide plate 171. The guide plate 171 for each wall plate 167, 169 extends at an angle up from the respective wall plate 167, 169 and away from the longitudinal axis LA of the storage tube 151. The guide plates 171 provide a surface to aid in guiding a fuel assembly into the fuel storage cell 105 formed within the storage tube 151. The guide plates 171 also help reduce the amount of wear and/or damage caused to the top edge of the wall plates 167, 169 during the process of loading a fuel assembly into the fuel storage cell 105. The guide plates 171 may be integrally formed with the wall plates 167, 169, or they be mounted as part of a separate structure to the external walls of the wall plates 167, 169.

Figure 4C:
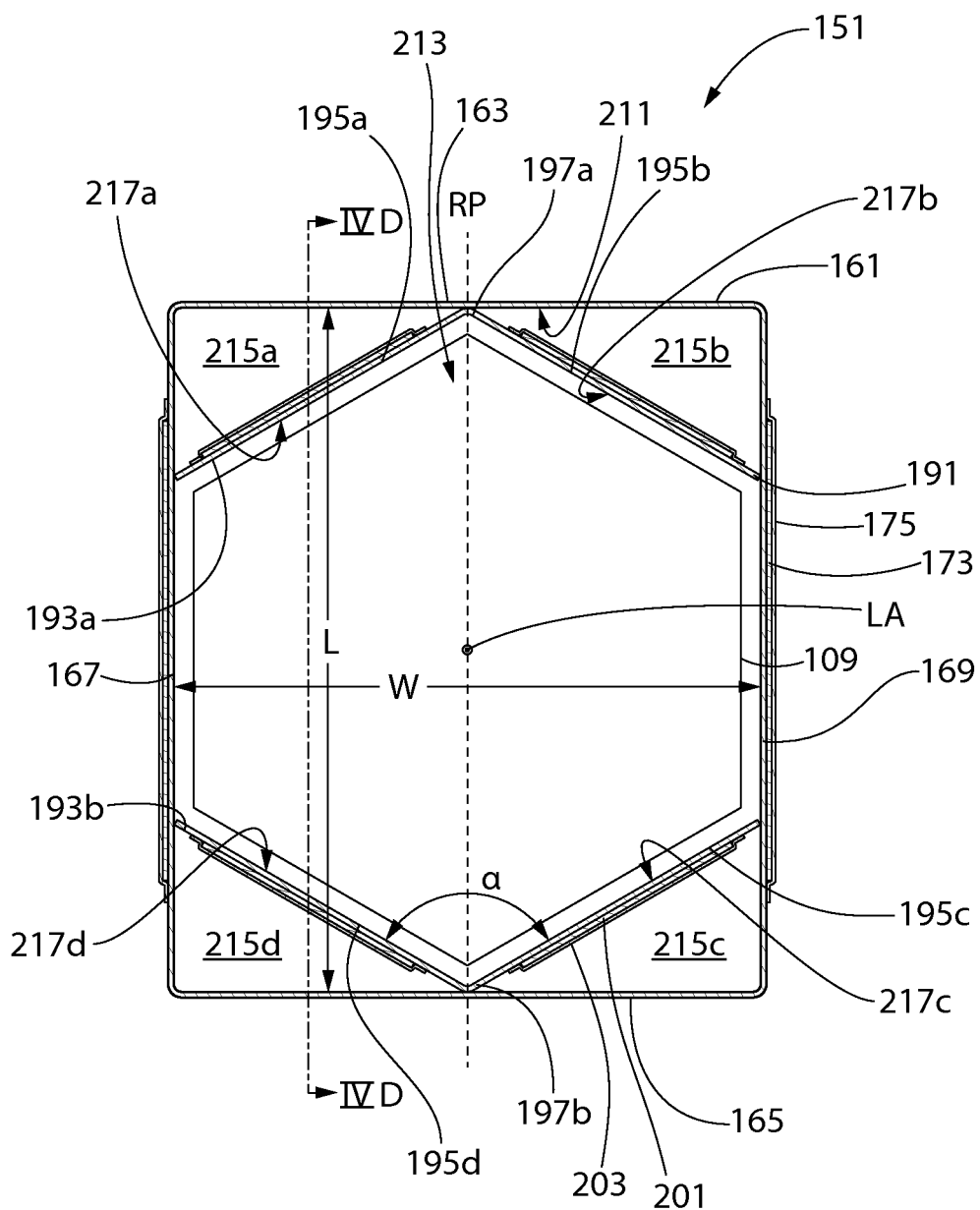
FIG. 4C is cross-sectional view of a single storage cell along the line IVC-IVC of FIG. 4A.

The outer walls of the second pair of opposing wall plates 167, 169 each have a neutron-absorbing plate 173 coupled thereto, and the neutron-absorbing plate 173 is secured in place against the outer walls of the second pair of opposing wall plates 167, 169 by an outer sheath 175. The outer sheath 175 encloses the neutron-absorbing plate 173 in a pocket 177, which is also shown in FIG. 4C, to protect the pool water from possible deterioration of the neutron-absorbing plate 173. The neutron-absorbing plate 173 and the outer sheath 175 extend a height H2, which is less than the height H1. The height H2 may be the equivalent of the height of a fuel assembly positioned for storage within the fuel storage cell 105. Of course, the height H2 of the neutron-absorbing plate 173 and the outer sheath 175 may, in certain embodiments, be as great as the height H1 of the outer tube 161.

Figure 3B:
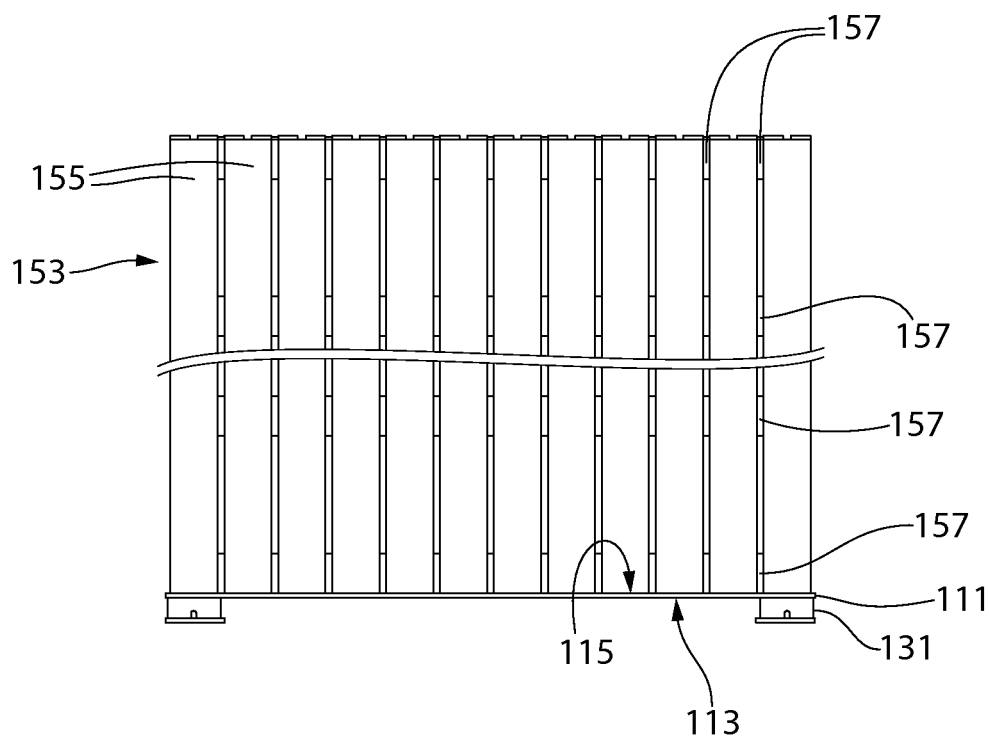
FIG. 3B is a first side elevation view of the fuel rack of FIG. 2.
Figure 3C:
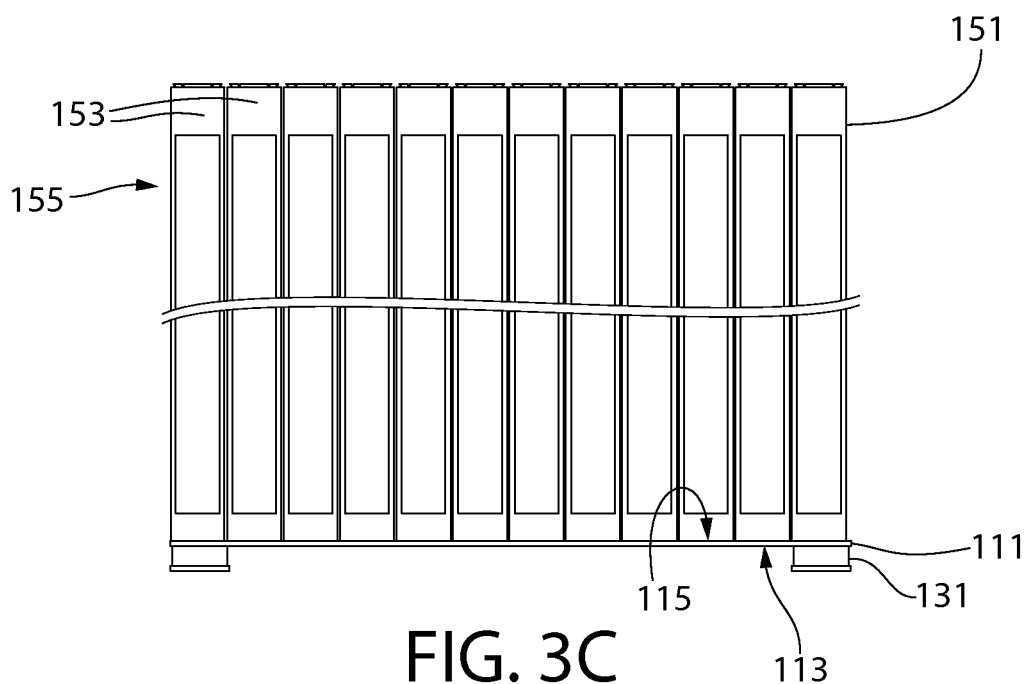
FIG. 3C is a second side elevation view of the fuel rack of FIG. 2.
Figure 3D:
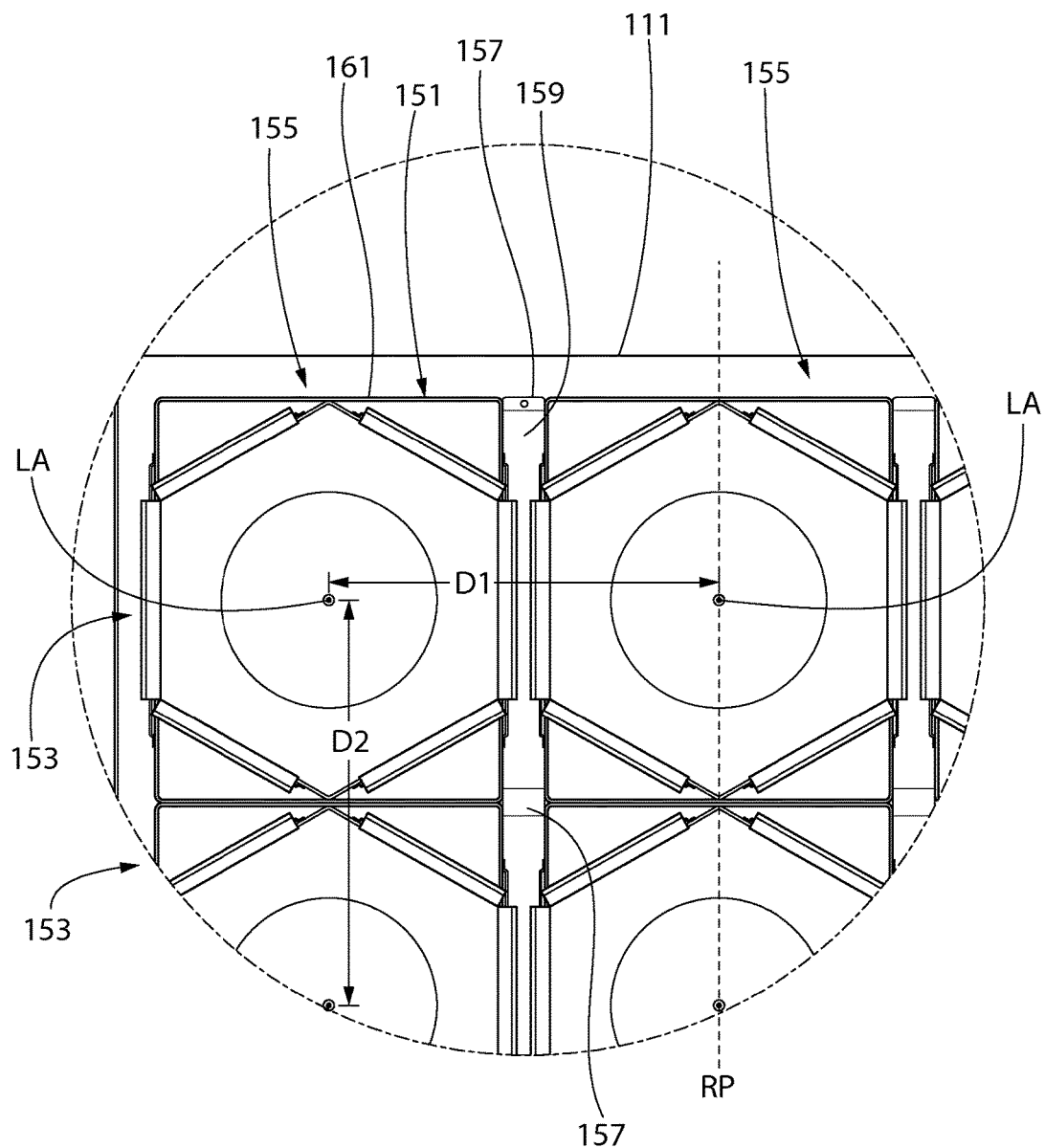
FIG. 3D is a detail view of the portion IIID of FIG. 3A.

An inner plate-assemblage 191 is positioned within the outer tube 161 to help form the fuel storage cell 105. The inner plate-assemblage 191 includes two chevron plates 193a, 193b, which may be of identical design. An exemplary chevron plate 193, representative of both chevron plates 193a, 193b, is shown in FIG. 3B. The chevron plate 193 includes two wall plates 195 adjoined at an apex edge 197, and each wall plate 195 may have a height H3, which is slightly less than the height H1 of the wall plates 163, 165, 167, 169 of the storage tube 151.

The top of each wall plate 195 includes a guide plate 199. The guide plate 199 for each wall plate 195 extends at an angle up from the respective wall plate 195, such that when the chevron plate 193 is in place within the outer tube 161 of the storage tube 151, the guide plates 199 also extend away from the longitudinal axis LA of the storage tube 151. The guide plates 199 provide a surface to aid in guiding a fuel assembly into the fuel storage cell 105 formed within the storage tube 151. The guide plates 199 also help reduce the amount of wear and/or damage caused to the top edge of the wall plates 195 during the process of loading a fuel assembly into the fuel storage cell 105. The guide plates 199 may be integrally formed with the wall plates 195, or they be mounted as part of a separate structure to the external walls of the wall plates 195.

The outer walls of the wall plates 195 each have a neutron-absorbing plate 201 coupled thereto, and the neutron-absorbing plate 201 is secured in place against the outer walls of the wall plates 195 by an outer sheath 203. Each outer sheath 203 encloses the respective neutron-absorbing plate 201 in a pocket 205, which is also shown in FIG. 4C, to protect the pool water from possible deterioration of the neutron-absorbing plate 201. The neutron-absorbing plate 201 and the outer sheaths 203 extend a height H2, which is less than the height H3 of the wall plates 195. The height H2 may be the equivalent of the height of a fuel assembly positioned for storage within the fuel storage cell 105. Of course, the height H2 of the neutron-absorbing plate 201 and the outer sheaths 203 may, in certain embodiments, be as great as the height H3 of the wall plates 195.

The dimension and position of the neutron-absorbing plate 173 on the wall plates 167, 169 of the outer tube 161, and the neutron-absorbing plate 201 on the wall plates 195 of the chevron plates 193, may be determined by the position and dimension of a fuel assembly positioned for storage within the fuel storage cell 105, and more particularly by the position and dimension of fuel rods contained within any such fuel storage assembly. The neutron-absorbing plates 173, 201 are generally placed on the respective wall plates 167, 169, 195 and dimensioned so that the height H2 is at least as great as the height of stored fuel rods within the fuel storage cell 105. Such dimensioning of the neutron-absorbing plates 173, 201 helps ensure that neutron emissions, directed toward any of the wall plates 167, 169, 195 from the fuel assembly within the fuel storage cell 105, are incident on the neutron-absorbing plates 173, 201. The outer sheaths 175, 203 on the wall plates 167, 169, 195 are dimensioned to provide a sufficiently large enclosure to secure the neutron-absorbing plates 173, 201 to the respective wall plates 167, 169, 195.

The neutron-absorbing plate 173, 201 may be formed of a material containing a neutron absorber isotope embedded in the microstructure, such as elemental boron or boron carbide. Metamic, produced by Metamic, LLC, which is made of an aluminum alloy matrix with embedded boron carbide, is an example of an acceptable material. In certain embodiments, the outer sheaths 175, 203 may be formed of materials such as stainless steel, borated stainless steel, or any other type of steel appropriate for use in the long term storage environment for spent nuclear fuel.

In certain embodiments, particularly those in which the neutron-absorbing plates 173, 201 are not formed of a material which is brittle or becomes brittle over time, thereby presenting a risk of deterioration and contamination of the pool water, the neutron-absorbing plates 173, 201 may be secured directly to the respective wall plates 167, 169, 195. In such embodiments, the outer sheaths 175, 203 may be omitted, or alternatively, the outer sheaths 175, 203 may be configured to couple the neutron-absorbing plates 173, 201 to the respective wall plates 167, 169, 195 without enclosing the neutron-absorbing plates 173, 201 in an envelope.

FIG. 4C shows a cross-section of an exemplary storage tube 151. The outer tube 161 has a width W in the row direction and a length L in the column direction, and the length L in the column direction is greater than the width w in the row direction. The inner surface 211 of the outer tube 161 of the storage tube 151 defines an inner cavity 213, and a hexagonal fuel storage cell 105 is formed within the inner cavity 213 of the storage tube 151. The profile of a hexagonal fuel assembly 109 is shown for reference within the fuel storage cell 105. In certain embodiments, the gap between the fuel assembly 109 and the walls forming the fuel storage cell 105 is less than about 4 mm around all sides of the fuel assembly 109. The inner plate-assemblage 191 is positioned within the outer tube 161 to divide the inner cavity 213 into a plurality of interior flux trap chambers 215a-d and the fuel storage cell 105. In the rectilinear array of the storage tubes 151, these flux trap chambers 215a-d serve as interior flux trap chambers between the fuel storage cells 105 of adjacent storage tubes 151 in the fuel rack 101. Thus, storage tubes 151 that are adjacent within a row have their respective fuel storage cells 105 separated by four flux trap chambers, two from each of the adjacent storage tubes 151.

The inner plate-assemblage 191 includes two chevron plates 193a, 193b. Each chevron plate 193a, 193b includes two wall plates 195a-d, and each wall plate 195a-d is oblique to and extends between adjacent sides of the outer tube 161 to form the plurality of interior flux trap chambers 215a-d within the inner cavity 213.

Specifically, the wall plate 195a of the chevron plate 193a extends between the wall plate 167 of the outer tube 161 and the wall plate 163 of the outer tube 161 to form the interior flux trap chamber 215a. With the wall plate 195a positioned in this manner, the interior flux trap chamber 215a is formed between the wall plate 195a of the chevron plate 193a and a corner section formed at the intersection of wall plates 163, 167 of the outer tube 161. The wall plate 195b of the chevron plate 193a extends between the wall plate 169 of the outer tube 161 and the wall plate 163 of the outer tube 161 to form the interior flux trap chamber 215b. With the wall plate 195b positioned in this manner, the interior flux trap chamber 215b is formed between the wall plate 195b of the chevron plate 193a and a corner section formed at the intersection of wall plates 163, 169 of the outer tube 161. The wall plate 195a and the wall plate 195b are joined at an apex edge 197a of the chevron plate 193a. The edges of the wall plates 195a, 195b that are positioned against the wall plates 167, 169, respectively, are contiguously welded to the inner surface 211 of the rectangular outer tube 161. Similarly, the wall plate 195c of the chevron plate 193b extends between the wall plate 169 of the outer tube 161 and the wall plate 165 of the outer tube 161 to form the interior flux trap chamber 215c. With the wall plate 195c positioned in this manner, the interior flux trap chamber 215c is formed between the wall plate 195c of the chevron plate 193b and a corner section formed at the intersection of wall plates 165, 169 of the outer tube 161. The wall plate 195d of the chevron plate 193b extends between the wall plate 167 of the outer tube 161 and the wall plate 165 of the outer tube 161 to form the interior flux trap chamber 215d. With the wall plate 195d positioned in this manner, the interior flux trap chamber 215d is formed between the wall plate 195d of the chevron plate 193b and a corner section formed at the intersection of wall plates 165, 167 of the outer tube 161. The wall plate 195c and the wall plate 195d are joined at an apex edge 197b of the chevron plate 193a. The edges of the wall plates 195c, 195d that are positioned against the wall plates 167, 169, respectively, are contiguously welded to the inner surface 211 of the rectangular outer tube 161.

With this configuration of the chevron plates 193a, 193b within the outer tube 161, the hexagonal fuel storage cell 105 is defined by: the inner surface 217a of the first wall plate 195a of the first chevron plate 193a; the inner surface 217b of the second wall plate 195b of the first chevron plate 193a; the inner surface 217c of the first wall plate 195c of the second chevron plate 193b; the inner surface 217d of the second wall plate 195d of the second chevron plate 193b; a portion of the inner surface 211 of the wall plate 167 of the outer tube 161; and a portion of the inner surface 211 of the wall plate 169 of the outer tube 161. Each of the flux trap chambers 215a-d formed by this configuration of the chevron plates 193a, 193b have triangular transverse cross-sections. The size and hexagonal cross-sectional shape of the fuel storage cell 105 is designed and constructed so that the fuel storage cell 105 can accommodate no more than one fuel assembly 109. Due to the different cross-sectional shape of the flux trap chambers 215a-d, as compared to the cross-sectional shape of the typical fuel storage assembly, the flux trap chambers 215a-d are not able to accommodate a fuel assembly that has a square or hexagonal transverse cross-section.

The apex edges 197a, 197b of each of the chevron plates 193a, 193b are located in a reference plane RP that is defined by including the longitudinal axis LA of the storage tube 151 and being perpendicular to the wall plates 163, 165 of the outer tube 161. The apex edges 197a, 197b may form an angle of 120°, so that the resulting hexagonal cross-sectional shape of the fuel storage cell 105 forms a regular hexagon. In alternative embodiments, the apex edges 197a, 197b may form an angle α of slightly less than 120°, within the range of about 120°-115°, so that the resulting hexagonal cross-sectional shape of the fuel storage cell 105 varies slightly away from the form of a regular hexagon. When the hexagonal fuel assembly is placed within the fuel storage cell 105, the fuel assembly may rattle undesirably during a seismic or other rattling event. By having the apex edges 197a, 197b forming an angle of slightly less than 120°, the acute edges of the fuel assembly that face the apex edges 197a, 197b are prevented from impacting the apex edges 197a, 197b during a seismic or other rattling event.

Figure 4D:
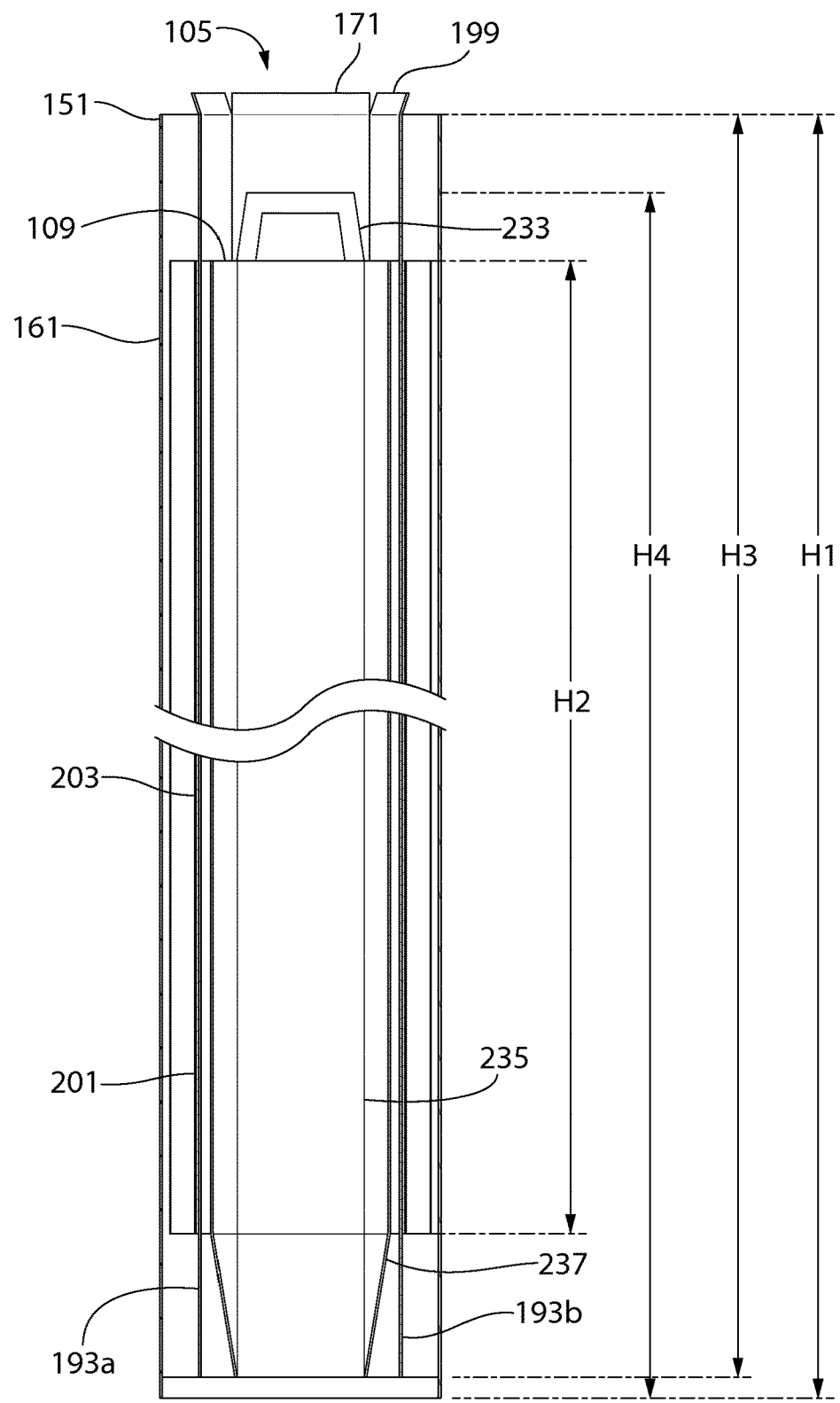
FIG. 4D is a cross-sectional view of a single storage cell along the line IVD-IVD of FIG. 4C.

A cross-section of the storage tube 151 is shown in FIG. 4D with a schematic representation of a fuel assembly 109 disposed within the fuel storage cell 105. Similar to hexagonal fuel assemblies commonly in use, the fuel assembly 109 includes a top handle 233, a body portion 235, in which a plurality of nuclear fuel rods (not shown) are housed, and a tapered bottom portion 237. The handle 233 and the tapered bottom portion 237 facilitate inserting the fuel assembly 109 into the fuel storage cell 105 of the storage tube 151. When the fuel assembly 109 is being inserted into the storage tube 151, the tapered bottom portion 237 may engage the guide plates 171, 199 to aid in centering the fuel assembly 109 within the fuel storage cell 105. As shown, with the fuel assembly 109 fully inserted into the fuel storage cell 105, the height H1 of the outer tube 161 is greater than the overall height H4 of the fuel assembly 109. The height H3 of the chevron plates 193a, 193b is also less than the height H1 of the outer tube 161. The lower edges of the chevron plates 193a, 193b do not extend to the lower edge of the outer tube 161, so that a gap is formed at the lower end of the storage tube 151 for cooling fluid to flow into the flux trap chambers 215a-d. In certain embodiments, the chevron plates 193a, 193b may include apertures at their bottom edges for cooling fluid to flow into the flux trap chambers 215a-d, and in such embodiments, the height H3 of the chevron plates 193a, 193b may be the same as the height H1 of the outer tube 161.

The height H2 of the neutron-absorbing plates 201 coupled to the chevron plates 193a, 193b (and the neutron-absorbing plates 173 coupled to the outer tube 161 as shown in FIG. 4C) is substantially the same as the height of the body portion 235 of the fuel assembly 109. In certain embodiments, the height H2 of the of the neutron-absorbing plates 201 (and 173) may be less than the height of the body portion 235 of the fuel assembly 109. The height H2 of the neutron-absorbing plates 201 (and 173) may be designed to provide appropriate shielding of adjacent fuel assemblies from one another. This is because adjacent spent nuclear fuel rods may not extend the entire length of the body portion 235 of the fuel assembly 109, and the height of the neutron-absorbing plates 201 (and 173) need only be high as the nuclear fuel rods when the fuel assembly 109 is positioned within the storage tube 151.

Figure 5:
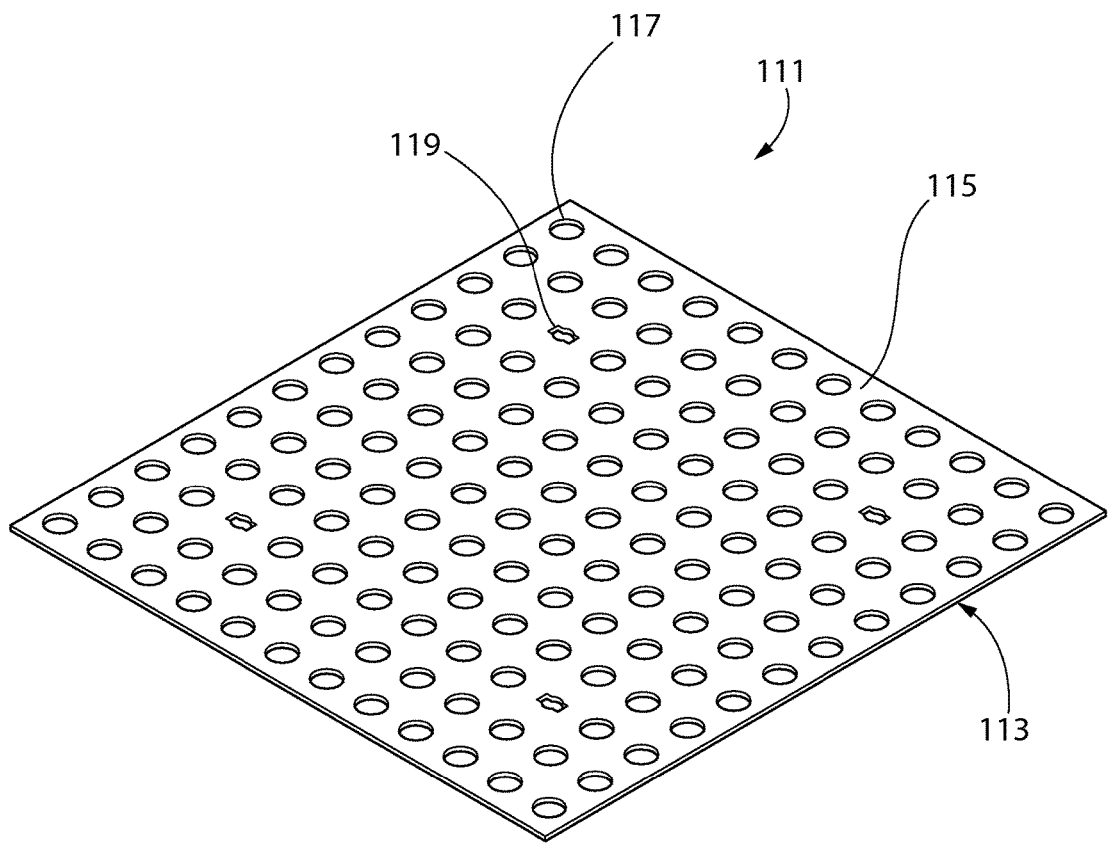
FIG. 5 is a perspective view of the bottom plate of the fuel rack of FIG. 1.

The base plate 111, which is shown in FIG. 5, includes a plurality of flow holes 117 extending through the base plate 111 from the bottom surface 113 to the top surface 115. The base plate 111 also includes four oblong holes 119 (second row in from the corners) for lifting and installing the fuel rack 101 within the fuel pool 103. Typically, a special lifting beam with four long reach rods is used to interact with the oblong holes 119 to grapple the fuel rack 101 for transfer into or out of, or movement within, the pool 103.

The flow holes 117 (and oblong holes 119) create passageways from below the base plate 111 into the bottom ends of the fuel storage cells 105 formed by the storage assemblies 151. As shown, a single flow hole 117 is provided for each storage assembly 151. In certain embodiments, multiple flow holes 117 may be provided for each storage assembly 151 to provide cooling fluid to the fuel storage cell 105 and each of the flux trap chambers 215a-d. The flow holes 117 serve as fluid inlets to facilitate natural thermo-siphon flow of pool water through the fuel storage cells 105 when fuel assemblies having a heat load are positioned therein. More specifically, when heated fuel assemblies are positioned in the fuel storage cells 105 in a submerged environment, the water within the fuel storage cells 105, and within the flux trap chambers 215a-d, surrounding the fuel assemblies becomes heated, thereby rising due to increased buoyancy. As this heated water rises and exits the storage assemblies 151 via their open top ends, cool water is drawn into the bottom of the fuel storage cells 105 and the flux trap chambers 215a-d via the flow holes 117. This heat induced water flow along the fuel assemblies then continues naturally.

Figure 6:
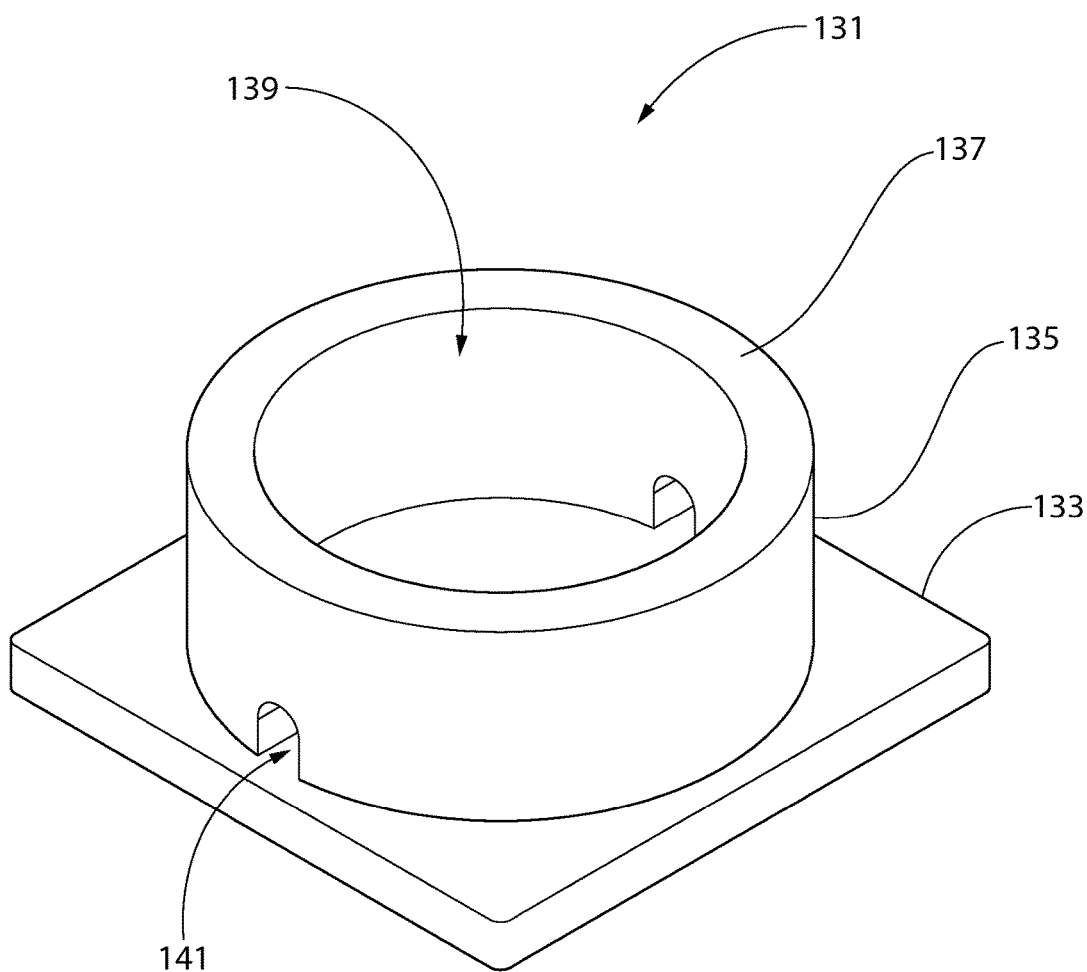
FIG. 6 is a perspective view of the bottom support of the fuel rack of FIG. 1.

A support pedestal 131 for the fuel rack 101 is shown in FIG. 6. The support pedestals 131 affixed to the bottom surface 113 of the base plate 111 ensure that a space exists between the floor of the pool 103 and the bottom surface 113 of the base plate 111, thereby creating an inlet plenum for water to flow through the flow holes 117. The support pedestal 131 includes a base portion 133 and a riser portion 135 formed about an interior flow space 139. The riser portion 135 includes flow apertures 141 through which water from the pool 103 may pass from a space external to the support pedestal 131 into the interior flow space 139. Water passing into the interior flow space 139 may then pass up through a flow hole 117 in the base plate 111 to enable the cooling process described above. Although the riser portion 135 is depicted as being annular, in certain embodiments the riser portion 135 may have any geometrical configuration which supports the base plate 111 above the floor of the pool 103 and permits water from the pool 103 to flow into any flow holes 117 in the base plate 111 near which the support pedestal 131 may be affixed.

The fuel rack 101 described above with reference to FIGS. 1-6 is intended to be placed free standing in a pool 103, without being coupled to sides or the bottom of the pool. However, in certain embodiments, a coupler may be used to aid in securing the position of the fuel rack 101 within the pool 103 during a seismic or other rattling event. Other than the neutron absorbing material described above, the fuel rack may be formed entirely from austenitic stainless steel. Although other materials may be used, some materials, such as borated stainless steel, are not preferred for a free standing fuel rack 101 within a pool 103, as the greater weight of materials such as borated steel aggravate the seismic response of the fuel rack 101, thus forcing the fuel rack 101 to be anchored.

Figure 7:
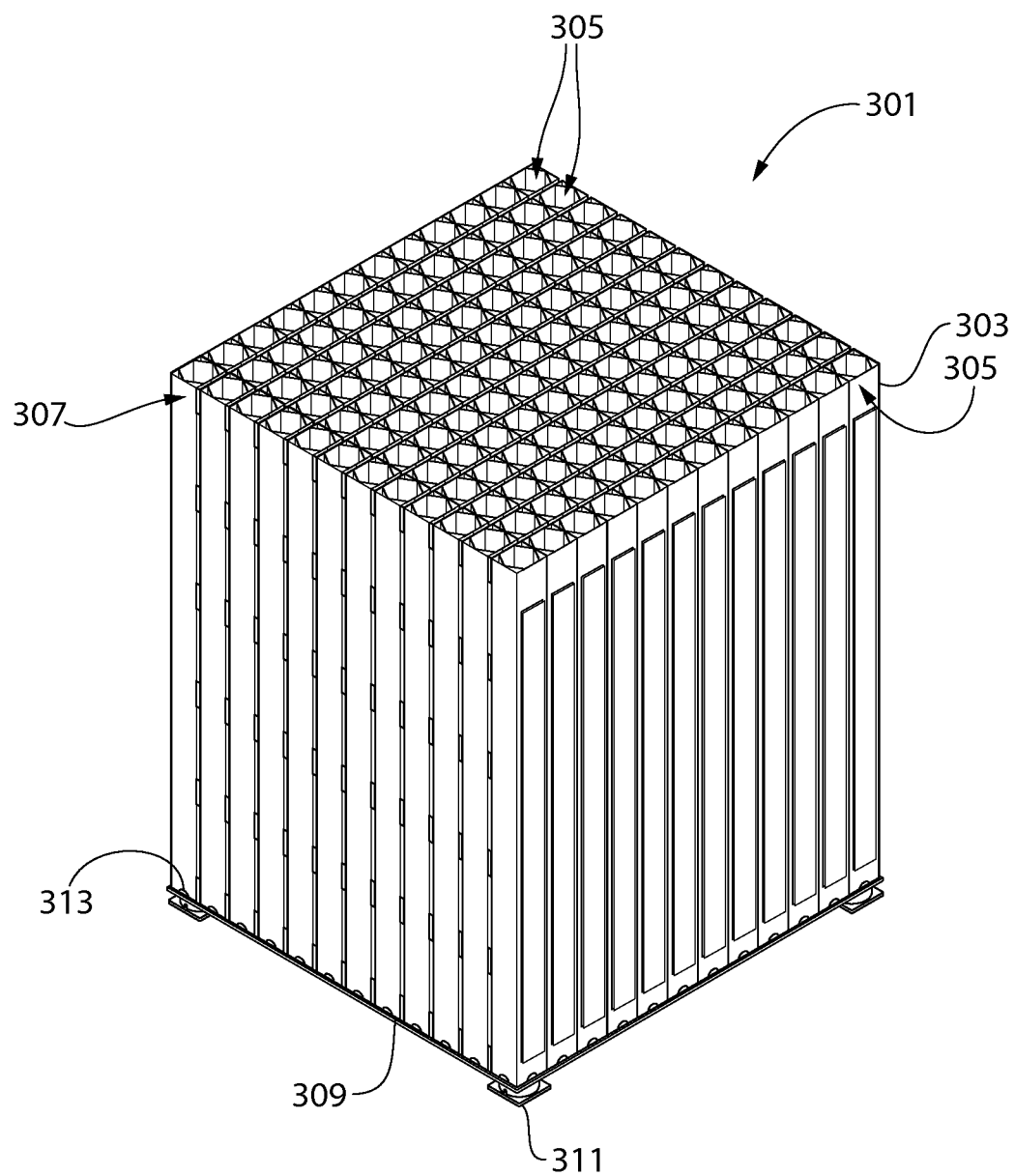
FIG. 7 is a perspective view of a second embodiment of a fuel rack for storing fuel assemblies.

An alternative embodiment of a fuel rack 301 is shown in FIG. 7. This fuel rack 301 includes a plurality of storage tubes 303 affixed to the top surface of a base plate 309, and support pedestals 311 affixed to the bottom surface of the base plate 309. The storage tubes 303 each include a fuel storage cell 305, and they are placed together in a side-by-side arrangement to form a plurality of rows 305 and a plurality of columns 307 as part of a rectilinear array, in the manner described above. A plurality of auxiliary flow apertures 313 are included in the storage tubes 303 at or near their bottom edges. In certain embodiments, at least one auxiliary flow aperture 313 is included in each face of the storage tubes 303, even those faces of storage tubes 303 that are placed in surface contact with the face of an adjacent storage tube 303. The auxiliary flow apertures 313 act as additional inlet openings (when combined with flow holes in the base plate 309) for incoming pool water to facilitate the thermosiphon flow during the cooling process. While an auxiliary flow aperture 313 is shown in each face of each and every storage tube 303 in the fuel rack 301, in certain embodiments the auxiliary flow aperture 313 may be omitted from a select subset of faces for select storage tubes 303.

Various other modifications of the embodiments of the present invention will readily be apparent to those skilled in the art and are encompassed within the scope of the invention as defined in the appended claims.

What is claimed is:

1. A fuel rack apparatus comprising:
    a base plate having an upper surface and a lower surface;
    a plurality of storage tubes coupled to the upper surface of the base plate in a side-by-side arrangement to form a rectilinear array of the storage tubes, each of the storage tubes extending along a longitudinal axis and comprising:
        a rectangular outer tube having an inner surface defining an inner cavity;
        a first chevron plate comprising a first wall plate and a second wall plate;
        a second chevron plate comprising a first wall plate and a second wall plate;
        the first and second chevron plates positioned in the inner cavity in opposing relation to divide the inner cavity into: (1) a first chamber formed between the first wall plate of the first chevron plate and a first corner section of the rectangular outer tube; (2) a second chamber formed between the second wall plate of the first chevron plate and a second corner section of the rectangular outer tube; (3) a third chamber formed between the first wall plate of the second chevron plate and a third corner section of the rectangular outer tube; (4) a fourth chamber formed between the second wall plate of the second chevron plate and a fourth corner section of the rectangular outer tube; and (5) a fuel storage cell having a hexagonal transverse cross-section and configured to receive a fuel assembly containing spent nuclear fuel.

2. The fuel rack apparatus according to claim 1, wherein for each of the storage tubes, the rectangular outer tube comprises a first wall plate, a second wall plate opposite the first wall plate, a third wall plate, and a fourth wall plate opposite the third wall plate.

3. The fuel rack apparatus according to claim 2, wherein for each of the storage tubes, the fuel storage cell is defined by: an inner surface of the first wall plate of the first chevron plate; an inner surface of the second wall plate of the first chevron plate; an inner surface of the first wall plate of the second chevron plate; an inner surface of the second wall plate of the second chevron plate; a portion of an inner surface of the first wall plate of the rectangular outer tube; and a portion of an inner surface of the second wall plate of the rectangular outer tube.

4. The fuel rack apparatus according to claim 2, wherein for each of the storage tubes, the first chevron plate comprises a first apex edge and the second chevron plate comprises a second apex edge; and wherein for each of the storage tubes, the first and second apex edges are located in a reference plane that comprises the longitudinal axis and is perpendicular to the third and fourth wall plates of the rectangular outer tube.

5. The fuel rack apparatus according to claim 1, wherein each of the storage tubes further comprises:
    a first neutron absorbing plate coupled to an outer surface of the first wall plate of the first chevron plate, the first neutron absorbing plate located within the first chamber;
    a second neutron absorbing plate coupled to an outer surface of the second wall plate of the first chevron plate, the second neutron absorbing plate located within the second chamber;
    a third neutron absorbing plate coupled to an outer surface of the first wall plate of the second chevron plate, the third neutron absorbing plate located within the third chamber;
    a fourth neutron absorbing plate coupled to an outer surface of the second wall plate of the second chevron plate, the fourth neutron absorbing plate located within the fourth chamber;
    a fifth neutron absorbing plate coupled to an outer surface of a first wall plate of the rectangular outer tube; and
    a sixth neutron absorbing plate coupled to an outer surface of a second wall plate of the outer tube, the first wall plate of the outer tube opposite the second wall plate of the rectangular outer tube.

6. The fuel rack apparatus according to claim 1, for each of the storage tubes, each of the first and second wall plates of the first chevron plate have a side edge that is contiguously welded to the inner surface of the rectangular outer tube; and wherein for each of the storage tubes, each of the first and second wall plates of the second chevron plate have a side edge that is contiguously welded to the inner surface of the rectangular outer tube.

7. The fuel rack apparatus according to claim 1, wherein the rectilinear array of the storage tubes comprises a plurality of rows of the storage tubes and a plurality of columns of the storage tubes; wherein for each of the rows of the storage tubes, the longitudinal axes of adjacent ones of the storage tubes in the row are separated from one another by a first distance; and wherein for each of the columns of the storage tubes, the longitudinal axes of adjacent ones of the storage tubes in the column are separated from one another by a second distance, the second distance being greater than the first distance.

8. The fuel rack apparatus according to claim 7, wherein for each of the rows of the storage tubes, adjacent ones of the storage tubes in the row are spaced apart from one another by an exterior flux trap formed between the outer tubes of the adjacent ones of the storage tubes in the row.

9. The fuel rack apparatus according to claim 7, wherein for each of the columns, the outer tubes of adjacent ones of the storage tubes in the column are in surface contact with one another.

10. The fuel rack apparatus according to claim 9, wherein for each of the columns, the first, second, third, and fourth chambers of the storage tubes in the column act as interior flux trap chambers between the fuel storage cells of the adjacent ones of the storage tubes in the column.

11. The fuel rack apparatus according to claim 10, wherein for each of the storage tubes, the first chevron plate comprises a first apex edge and the second chevron plate comprises a second apex edge; and wherein for each of the columns, the first and second apex edges of the storage tubes in the column are aligned along a columnar reference plane that includes the longitudinal axes of the storage tubes in the column.

12. The fuel rack apparatus according to claim 7, wherein for each of the storage tubes, the rectangular outer tubes have a width in a row direction and a length in a column direction, the length being greater than the width.

13. The fuel rack apparatus according to claim 1, wherein for each of the storage tubes, the first, second, third, and fourth chambers have a triangular transverse cross-section.

14. A fuel rack apparatus comprising:
a base plate having an upper surface and a lower surface;
a plurality of storage tubes coupled to the upper surface of the base plate in a side-by-side arrangement to form a rectilinear array of the storage tubes, each of the storage tubes extending along a longitudinal axis and comprising:
a rectangular outer tube having an inner surface defining an inner cavity;
a plurality of wall plates positioned in the inner cavity that divide the inner cavity into: (1) a first interior flux chamber formed between a first one of the wall plates and a first corner section of the rectangular outer tube; (2) a second interior flux chamber formed between a second one of the wall plates and a second corner section of the rectangular outer tube; (3) a third interior flux chamber formed between a third one of the wall plates and a third corner section of the rectangular outer tube; (4) a fourth interior flux chamber formed between a fourth one of wall plates and a fourth corner section of the rectangular outer tube; and (5) a fuel storage cell having a hexagonal transverse cross-section and configured to receive a fuel assembly containing spent nuclear fuel.

\* \* \* \* \*